United States Patent
Hauptmann et al.

(10) Patent No.: US 6,634,025 B1
(45) Date of Patent: Oct. 14, 2003

(54) SYSTEM FOR EXCHANGING SOFTWARE PROCESSES DURING EXECUTION USING THREADS

(75) Inventors: Steffen Hauptmann, Aachen (DE); Josef Wasel, Bedburg (DE)

(73) Assignee: Koninklijke Philips Electronics N. V., Eindhoven (NL)

( * ) Notice: Subject to any disclaimer, the term of this patent is extended or adjusted under 35 U.S.C. 154(b) by 0 days.

(21) Appl. No.: 08/851,305

(22) Filed: May 5, 1997

(30) Foreign Application Priority Data

May 6, 1996 (DE) .......................................... 196 17 976

(51) Int. Cl.[7] .............................. G06F 9/44; G06F 9/445
(52) U.S. Cl. ........................ 717/168; 717/170; 717/172; 717/173; 717/174; 717/178
(58) Field of Search .................... 395/712, 200.51, 395/677, 678; 709/107, 108, 221; 717/168, 170, 172, 173, 174, 175, 178

(56) References Cited

U.S. PATENT DOCUMENTS

| | | | |
|---|---|---|---|
| 4,954,941 A | * 9/1990 | Redman ...................... | 717/162 |
| 5,155,837 A | 10/1992 | Liu et al. .................... | 395/500 |
| 5,210,854 A | * 5/1993 | Beaverton et al. .......... | 717/174 |
| 5,274,808 A | * 12/1993 | Miyao et al. ............... | 717/168 |
| 5,295,263 A | * 3/1994 | Kojima et al. .............. | 717/168 |
| 5,359,730 A | * 10/1994 | Marron ....................... | 717/169 |
| 5,410,703 A | * 4/1995 | Nilsson et al. .............. | 717/168 |
| 5,511,194 A | * 4/1996 | Shirakata et al. ........... | 709/104 |
| 5,555,418 A | * 9/1996 | Nilsson et al. .............. | 717/153 |
| 5,613,133 A | * 3/1997 | Bell et al. ................... | 717/162 |
| 5,619,698 A | * 4/1997 | Lillich et al. ............... | 717/168 |
| 5,682,533 A | * 10/1997 | Siljestroemer ............. | 707/200 |
| 5,761,504 A | * 6/1998 | Corrigan et al. ............ | 713/2 |
| 5,764,992 A | * 6/1998 | Kullick et al. .............. | 717/170 |
| 5,797,016 A | * 8/1998 | Chen et al. ................. | 717/171 |
| 5,845,077 A | * 12/1998 | Fawcett ....................... | 709/221 |
| 6,049,671 A | * 4/2000 | Slivka et al. ................ | 717/173 |
| 6,073,214 A | * 6/2000 | Fawcett ....................... | 711/133 |
| 6,101,327 A | * 8/2000 | Holte-Rost et al. ......... | 717/170 |
| 6,161,218 A | * 12/2000 | Taylor ......................... | 717/174 |
| 6,202,205 B1 | * 3/2001 | Saboff et al. ............... | 717/151 |
| 6,327,617 B1 | * 12/2001 | Fawcett ....................... | 709/219 |

OTHER PUBLICATIONS

Paindaveine et al., "Process vs. Task Migration" Proceedings of the 29th Annual Hawaii International Conference on System Sciences, IEEE, 1996.*

Barak et al.., "Performance of PVM with Preemptive Process Migration Scheme", Proceedings of ICCSSE, IEEE, 1996.*

Gupta, D.; Jalote, P.; Baura, G.; "A Formal Framework for On–line Software Version Change"; IEEE Transactions on Software Engineering; vol. 22, No. 2, pp. 120–131, Feb. 1996.*

(List continued on next page.)

*Primary Examiner*—Ramesh Patel
*Assistant Examiner*—Kelvin Booker

(57) ABSTRACT

A communication system and, method are therefor, are provided. The system includes a control circuit which includes a message-based operating system and application software. The system also includes a device and/or software for exchanging/replacing application software. When a portion of the application software is to be exchanged, an old software component to be exchanged carries out a state transfer, stops at a certain point, and directs available messages to a new software component. The software components include an application thread and an exchange thread. The old software component gathers its state after the application thread has stopped at an exchange point. The exchange thread then transmits the state through an exchange port to the new software component.

16 Claims, 3 Drawing Sheets

OTHER PUBLICATIONS

Gupta, D.; Jalote, P.; "Increasing System Availability through On–line Software Version Change"; The Twenty–Third International Symposium on Fault–Tolerant Computing; pp. 30–35, Jun. 1993.*

Fujita, K.; Kanemaki, K.; Ishimoto, H.; Oda, N.; "Dynamic Program Updating Method for Packet Switching Systems"; NTT R & D, vol. 42, No. 8, pp. 1027–1036. (abstract) INSPEC [online]. Retrieved from Dialog Information Services. Accession No. 4551244, 1993.*

Hauptmann, S.; Wasel, J.; "On–line Maintenance with On–the–fly Software Replacement"; Proceedings of the Third International Conference on Configurable Distributed Systems; pp. 70–80, May 1996.*

Alonso, A.; Casillas, I.; de la Puente, J.; "Dynamic Replacement of Software in Hard Real–time Systems: Practical Assessment"; Proceedings of the Seventh Euromicro Workshop on Real–Time Systems; pp. 26–33, Jun. 1995.*

Stockenberg, J.; "A Dynamic Integration Architecture for High Availability Real–Time Systems"; Proceedings of the Conference on Software Maintenance; pp. 51–60, Sep. 1993.*

Alonso, A.; de la Puente, J.; "Dynamic Replacement of Software in Hard Real–time Systems"; Proceedings of the Fifth Euromicro Workshop on Real–Time Systems; pp. 76–81, Jun. 1993.*

Segal, M.; Frieder, O.; "On–The–Fly Program Modification: Systems for Dynamic Updating"; IEEE Software; vol. 10, Issue 2, pp. 53–65, Mar. 1993.*

"On–Line Maintenance with On–the–fly Software Replacement", Hauptmann et al, XP–002134719, Proceeding of International Conference on Configurable Distributed Sytems, 1996, pp. 70–80.

"Elektrisches Nachrichtenesen", vol. 64, No. 4, 1990, pp. 327–333.

Chorus Systems, "Overview of the CHORUS Distributed Operating Systems", M. Rozier et al, Technical Report: CS/TR–90–25, Apr. 1990, pp. 1–45.

* cited by examiner

SYSTEM FOR EXCHANGING SOFTWARE PROCESSES DURING EXECUTION USING THREADS

BACKGROUND OF THE INVENTION

The invention relates to a communication system comprising a control circuit, which control circuit
- includes a message-based operating system, application software and means for exchanging application software, and
- when application software is exchanged, causes an old software component to be replaced to carry out a state transfer and stop at a certain point to direct the available messages to a new software component.

Communication systems comprise computer systems or control circuits whose software is to be available for a long time and practically uninterruptedly. In the case of errors in the software, or also because of new requirements, certain software components are to be renewed. In that case the down time of the communication system is to be minimized.

A communication system which has practically no down time when a software component of a switching system is exchanged is known from U.S. Pat. No. 5,155,837. Before the exchange, first the contents and states of all the registers, processes and memory units are saved in a specific memory, while the old software is in operation (column 7, rows 30 to 36). The old version of the software is then loaded in a first partition. The new software is consecutively loaded in a second partition. Once the new software has been loaded and tested, the contents and states of all the registers, processes and memory units are transferred from the memory to the new software. This new software is then taken into operation. Then the new software, however, does not start to operate at the process point at which the old software was stopped, but at a defined program point. Besides, not individual software modules or software components are exchanged, but closed software is.

Furthermore, the document "Elektrisches Nachrichtenwesen, Vol. 64, no. 4, 1990, pages 327 to 333" has disclosed an exchange of software components during the operation of, for example, a switching center. In the case of an exchange, the system then causes an old software component to carry out a necessary state transfer. When predefined synchronization points are reached, the old software component is stopped and messages are redirected from the old to the new software component. The new software component is started and the old software component is stopped and removed. Details about the structure of the program provided for the exchange cannot be learnt from the document.

SUMMARY OF THE INVENTION

Therefore, it is an object of the invention to provide a realizable exchange procedure of software components in which procedure the operation is not restricted except during a brief delay period.

The object is achieved by a communication system of the type defined in the opening paragraph, in that the application software includes at least a process with at least an application thread and an exchange thread, in that an old process to be exchanged is at least provided for gathering its states after the application threads of the old process have stopped at an exchange point, and in that the exchange thread of the old process is used at least for transferring the states to a new process through exchange ports.

The exchange procedure according to the invention relates to processes which include, for example, a plurality of threads (sequentially running program partitions) among which there is an exchange thread for controlling the exchange. Due to the invention, a new process is started at the respective program point (exchange point) at which the old process has been stopped. In addition, all the states of the old process are transferred to the new process via an exchange thread of the old process. However, this may only apply to such systems that comprise an operating system that makes it possible to exchange messages between software components (for example CHORUS). Messages are then exchanged between various processes via software interfaces which are referenced ports in the following. The states are then exchanged via exchange ports of the old and the new process.

A process is exchanged so that no other process is affected thereby. The messages arriving from another client (another process) are transmitted to the new process and further processed after the exchange. The exchange is effected in that there is only a brief delay during the processing. Practical investigations have shown that the delay lies in the range of a few milliseconds.

A communication system may be a computer system, a switching center, a computer network or also server systems such as, for example, a video-on-demand server. A computer system comprises at least a computer in which a software component is to be exchanged.

An application thread has a first partition for gathering at least the states of the application thread of an old process to be exchanged, and is used for delivering the gathered states to the exchange thread of the old process. An application thread of a new process has a second partition for taking over the states from the exchange thread of the old process and for reconstructing objects related to the states.

The exchange of a process is introduced by a replacement server. This server is included in the control circuit as a further software component and is used for loading and starting a process and for identifying whether a newly started process is to replace an old process. A maintenance device delivers a new process to the replacement server via a transmission medium.

When a plurality of processes are to be exchanged, they are exchanged consecutively. Thus first a first process is exchanged and then the following processes in succession. When a plurality of processes are to be exchanged, the control can be taken over by the replacement server.

Once a new process has been loaded and started, which process is used for exchanging an old process, first a jump is made to an exchange point that corresponds to the exchange point of the old process in that normal program routines are skipped.

The invention likewise relates to a computer system comprising at least a computer and a method of exchanging software components.

These and other aspects of the invention are apparent from and will be elucidated with reference to the embodiments described hereinafter.

DETAILED DESCRIPTION OF THE PREFERRED EMBODIMENTS

Figure 1:
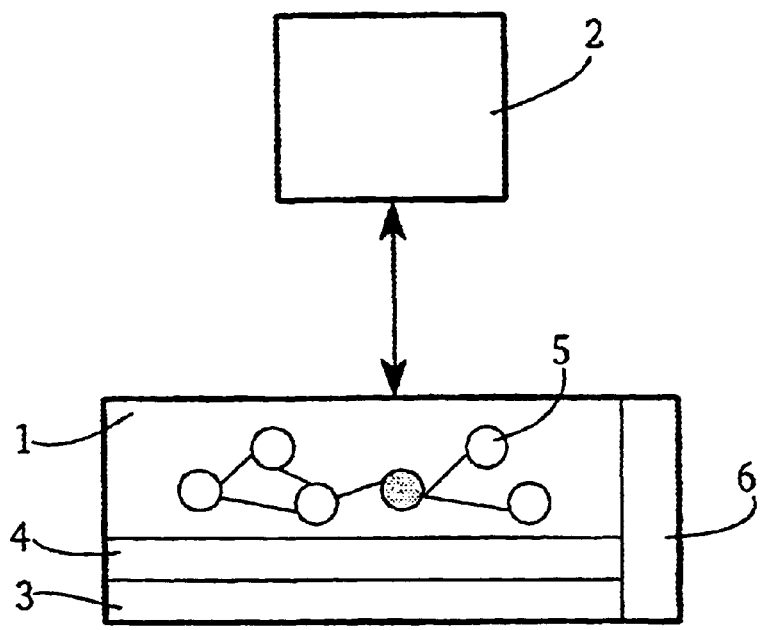
FIG. 1 shows a computer system comprising a maintenance device and a computer which contains exchangeable processes.

FIG. 1 is shown a computer system comprising a computer 1 and a maintenance device 2. The computer includes hardware components 3, an operating system 4, application software 5 and a replacement server 6. The operating system 4 is to enable a communication between software components of the application software 5 via messages (for example, message based operating system). The messages or data are then exchanged via software interfaces. In the following a software interface will be referenced a port.

The replacement server 6 is a software program by which components of the application software 5 can be exchanged. A software component to be exchanged is a process (actor) which contains various threads. A thread is an autonomous sequentially running part of a program. FIG. 1 shows the individual software components by means of circles. The connections between the circles are to indicate message flows between the software components.

The maintenance device 2 could be a remote computer from where a new software component is delivered. It is then conceivable for the new software component to be developed and tested on this computer. Known transmission media and protocols can be used for transmitting the new software component. For example, a transmission by a telephone network is possible. The new software component, however, could also be directly loaded in the computer 1 (for example, by means of a local maintenance device (laptop)).

Figure 2:
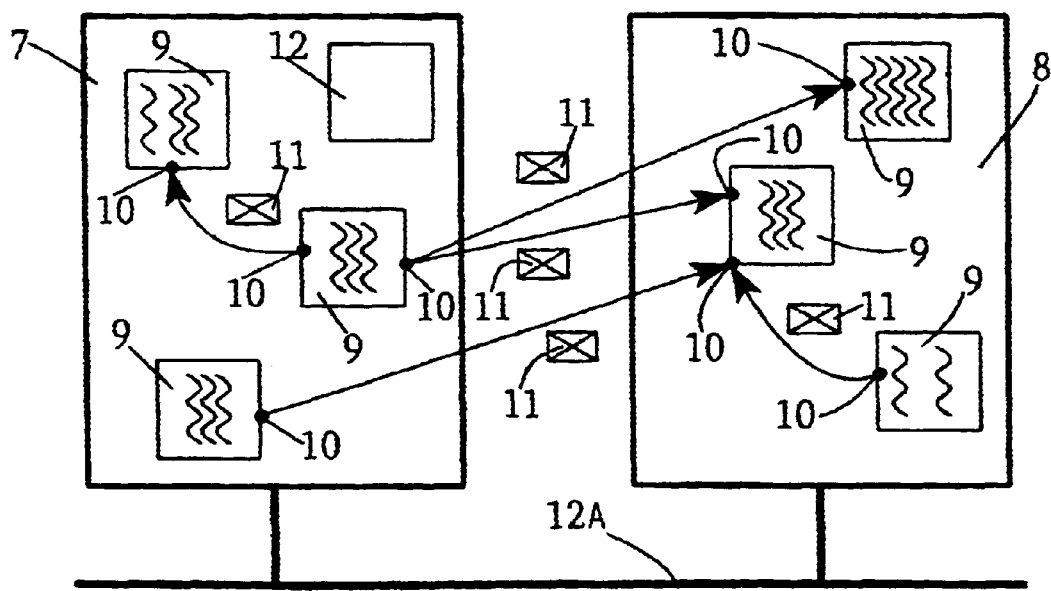
FIG. 2 shows a computer system which includes a local area network, FIG. 3 gives a symbolic representation of the process, FIG. 4 gives a symbolic representation of a new and an old process during the exchange, FIG. 5 gives a symbolic representation of a new and an old process after the exchange.

FIG. 2 shows a further embodiment for a computer system. The computer system is arranged as a local area network which has various nodes (for example, personal computer, workstations etc.) which are coupled to each other by hardware interfaces (for example, Ethernet interface). FIG. 2 shows as an example two nodes 7 and 8 of the network which include each application software containing various processes 9. Such a process has a protected address space, manages a number of ports through which the process exchanges messages 11 with other processes and—as observed above—various threads which are shown in FIG. 2 as waved lines. A process 9 can transmit or receive only messages 11 via its ports 10. The nodes 7 and 8 are coupled to further nodes (not shown) of the network via a network link 12A.

Threads in a process can also exchange messages via their own respective ports. Furthermore, messages can also be exchanged, for example, by Mutexes and semaphores. A Mutex (mutual exclusion) represents a method which enables only a single thread to access a certain range. For example, data are to be transmitted from a thread to a printer. In that case, the thread sets a Mutex, so that only this thread is capable of transmitting data to the printer. Another thread cannot send any data to the printer then. A semaphore represents a method which enables only a limited number of threads to access a certain range. Messages between threads of different processes can be exchanged only via the ports of the respective processes.

As a distributed operating system for the local area network of which FIG. 2, shows a section, can be used CHORUS (compare Rozier, M.; Abrossimov, V.; Armand, F.; Boule, I.; Gien, M.; Guillemont, M; Herrmann, F.; Kaiser, C.; Langlois, S.; Leonard, P.; Neuhauser, W.: Overview of the CHORUS distributed operating systems; CHORUS systems Technical Report CS-TR-90-25, 1990). For the application software can be selected, for example, the C or C ++ programming language.

For controlling the exchange of at least one process 9 of the network in FIG. 2, the node 7 further includes a replacement server 12. This replacement server 12 could also form part of another node (for example, node 8) instead of node 7.

When at least one process which is controlled by the replacement server 6 (FIG. 1) or 12 (FIG. 2) is to be replaced or exchanged, the new software component (new process) is loaded and started in the computer 1 (FIG. 1) or in a node 7 or 8 of the network (FIG. 2). Then, all the application threads of the old software component (old process) are stopped and the old process gathers the states of all the objects. The new process receives the states gathered by the old process and the ports of the old process with all the pending messages move to the new process. Once the object structures of the old have been adapted to the new processes, the threads of the new process are then started at the point that corresponds to the point of the old process. Finally, the old process is deleted.

For this exchange to be effected during the operation of the computer or of the local area network, certain changes with respect to non-exchangeable components are made in the components or processes of the application software. Each process which is to be exchangeable contains an additional thread which is referenced exchange thread and which carries out the exchange procedure and, furthermore, an additional exchange port, which is used for the communication during the exchange.

Figure 3:
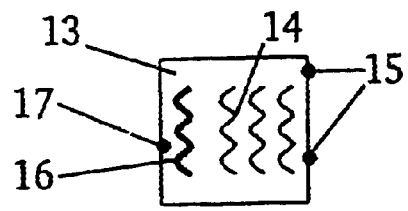

FIG. 3 gives a symbolic representation of what a process suitable for an exchange is to contain. The process 13 is shown as a square and its application thread 14 as a waved line. The process 13 exchanges data with a client through port 15. A client is another software component. As observed above, the exchangeable process additionally includes an exchange thread 16 and has an additional exchange port 17.

Figure 4:
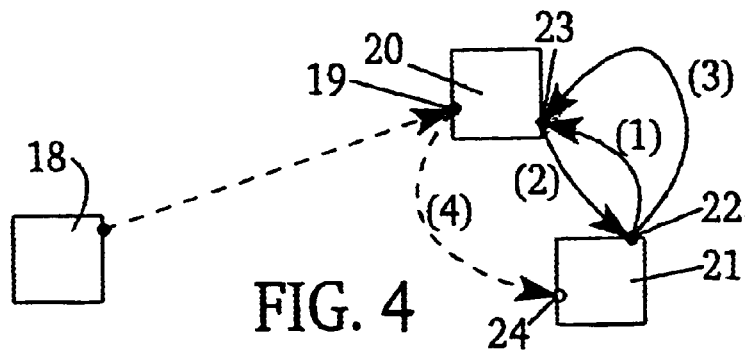

FIG. 4 shows the message flows for an exchange or replacement of a process. A client 18 sends messages to a port 19 (to be referenced service port in the following) of a process 20 installed thus far. The process 20 (predecessor component) is to be exchanged for a new process 21 (successor component). Once the successor component 21 has been loaded and started, an exchange instruction is sent from an exchange port 22 of the successor component 21 to the exchange port 23 of the predecessor component 20. The exchange instruction in FIG. 4 is indicated by an arrow referenced (1). Once the predecessor component 20 has stopped, it gathers its states and delivers them to the exchange port 22 of the successor component 21 (arrow (2)). Once everything has been transmitted, the predecessor component 20 is informed of this (arrow (3)). Subsequently, the service port 19 of the old process becomes accessible to the client 18 as a new service port 24 with the pending messages. This port change is denoted by the dashed arrow referenced (4).

Figure 5:
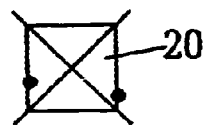

FIG. 5 shows the message flow after the exchange. The client 18 now sends messages to the service port 24 of the successor component 21. The predecessor component 20 is deleted which is indicated by two crossed lines over the square that represents the predecessor component 20.

In the exchange procedure mentioned above, an exchangeable process is started from. If a plurality of processes are to be exchanged, this exchange procedure can be split up into steps. A step is then the exchange of one process each time. As a result, it is simpler to control the exchange procedure and the necessary memory capacity is smaller than when various processes are exchanged simultaneously.

Furthermore, certain new processes which are to be to replace an old process may, for example, also include new functions. For retaining the compatibility with the old process it is necessary to render the previous functions available further in a new process. When all the clients that have used the old functions are gone, the old functionality may be declared invalid and disappear entirely when a subsequent exchange is introduced.

Figure 6:
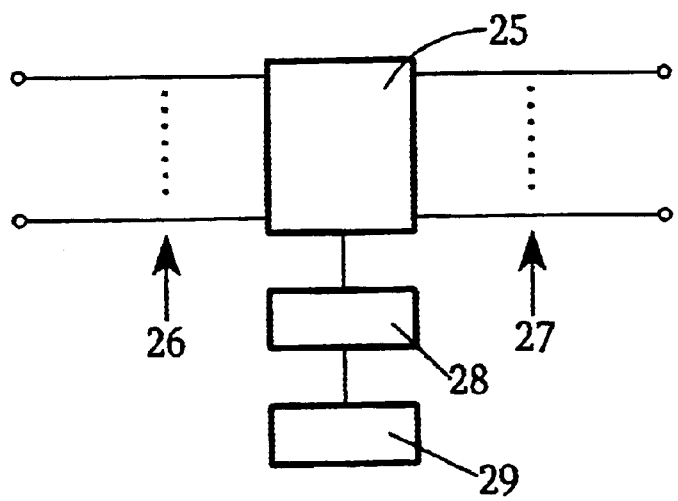
FIG. 6 shows a switching system comprising a maintenance device and a control circuit which control circuit contains exchangeable processes.

FIGS. 1 and 2 show two application possibilities for exchangeable software during operation. A further application possibility exists for systems which are used for transmitting messages. An example is a switching system whose main blocks are shown in FIG. 6. The switching system comprises a switching network 25 which conveys signals received on input lines 26 to one or more output lines 27. For controlling the switching network, there is a control circuit 28 which comprises, in addition to the necessary hardware components, an operating system, application software and a replacement server. For exchanging components of the application software, there is a maintenance device 29 which cooperates with a control circuit 28 in the same manner as the maintenance device 2 cooperates with the computer 1.

As described above, an exchange thread forms part of a process and is necessary for exchanging the process. Such an exchange thread provides an interface for the application threads in the process which interface renders the process exchangeable. A use of the interface in the C ++ programming language is a class definition which may be referenced, for example, "ExcThread". An application thread has exactly one entity of this class "ExcThread". The class has three methods: "getExcInfo", "setExcInfo" and "restartPointReached".

The method "ExcThread::getExcInfo" is to be called once at the beginning of each application thread. It provides the information whether an application component is started as a new component or an older version of this component is exchanged. In the case of an exchange, the method "ExcThread::getExcInfo" provides the state of the application thread of the old component and a parameter which describes the point at which the application thread of the new process can again be started.

Once the application thread of the new process has reconstructed all the objects, it is to call the method "ExcThread::restartPointReached". This method is used for synchronizing the start of all the application threads. It must be guaranteed that no application thread leaves this method before all the threads use this method. This ensures that all the objects are initialized before they are used by whatever application thread. This is especially important for those objects which share various application threads, for example, ports or semaphores.

The method "ExcThread::setExcInfo" can be called once by each application thread, after the application thread has been stopped for the exchange. This method is necessary for delivering the present state of this application thread to its respective new component.

A state transfer is necessary for the new process to take over, for example, states from the old process. The state transfer is effected between the stop of the old process and the start of the new process. For example, a state transfer is necessary for reproducing the state of an old telephone directory in the state of a new telephone directory. Such a transfer is necessary, for example, when a new field "postal codes" is added, or this field contains another type (for example, 5 instead of 4 digits).

The state transfer of a process means that all the states of its objects are to be transmitted. Each object then has two methods. One method fetches the states and one method stores the states.

The exchange operation is started when all the application threads of a process stop at a point where they can stop. These points are referenced stop points. When a stop point in a thread is reached, its normal operation is aborted and operations are carried out which relate to the exchange. Synchronization and communication points at which a thread can stop are selected as stop points.

Respective points where the new process can be started must be available at the stop points in the new process. These points are called restart points. The stop and restart points are referenced exchange points. The new process can be distinguished from the old process in the program code and in the object structures. In the new process, several objects may have disappeared, added or changed.

The following points are examples of exchange points:

Port::call

Port::receive

Semaphore::get

Mutex::get

Thread::delay

The notation of the programming language C ++ has been selected here. First the class name is entered and then the method name after the two colons (ClassName::MethodName). For example, "Mutex::get" denotes a method "get" which is available for all the objects of the Mutex type.

In the case where the time for an exchange is too long, there could be a problem for certain applications (for example, when software components are exchanged in a switching center). This certainly does not occur if the following five conditions are satisfied:

R1) An application runs on a system with a single processor.

R2) The processor load is less than 100%.

R3) There is ensured that within a given time interval, a process is guaranteed a certain processor time.

R4) It is not permitted for an exchange thread to be stopped asynchronously, i.e. no stop is made at a stop point.

R5) A thread in an exchange point can be discontinued, so that it leaves the stop point and continues in normal fashion.

If a processor is available (R1) and this processor has a load of less than 100% (R2), there is an instant at which all the threads of a process are stopped. If an exchange thread is available which has a priority lower than the priority of the other application threads of the process, the exchange thread is activated at this instant, because the process always receives a part of the available processor time within a given time interval (R3). All the application threads with the exception of the exchange thread itself are guaranteed to have stopped at a certain stop point (R4). The exchange thread then utilizes the processor time rendered available for executing the exchange operation and thereto Discontinues all the application threads (R5) present in the stop point.

When each stop point is an exchange point, there are often a large number of exchange points available. Many of the exchange points may be simple Mutex operations which prevent the parallel access to common data. Various operating systems do not permit the simple abortion of threads which have stopped in a Mutex. Therefore, a Mutex starting with "Mutex::get" and ending in "Mutex::rel" could be excluded as a potential exchange point. Under the condition that between "Mutex::get" and "Mutex::rel" there is no further stop point and that the Mutex is used only by the threads in the same process, there may be demonstrated that no thread is stopped in this Mutex when all the threads are stopped. Therefore, under these conditions, a Mutex may be excluded as an exchange point.

When an exchange point is realized, a method is implemented in which the thread to be exchanged itself moves to an abort state. In such a case the operating system terminates the abort state with a special return code which furthermore denotes an error code "abort". In the case of an abort, this return code can directly be interpreted as a signal for an exchange. In the following is given a C++ programming language example for "port:receive" (stop point) which belongs to a non-exchangeable thread:

(08) buf.clear( );
(09) errCode=servicePort.receive(buf, TimeOutPeriod);
(15) if(errCode==Port::TimeOut) {
(16) error(myName, "Server is Timed out"); //no return
(17) }

The numbers of the example given in brackets do not form a part of the program text and are only used for identifying the lines. In line (08) the buffer "buf" is cleared for the data to be received. With the "receive" statement in line (09), the buffer "buf" is filled with new data. The second parameter "TimeOutPeriod" of the "receive" statement is a value for a time transgression which is to avoid an infinite delay time, for example, for a crash caused by a client. In line (15), the error code for a time transgression ("TimeOut") is tested.

For converting this stop point into an exchange point, the example for "port::receive" is changed which then belongs to an exchangeable thread:

(01) ExcThread excThread( . . . ); //generation of an exchange thread object
(02) . . .
(08) buf.clear( );
(09) errCode=servicePort.receive(buf, TimeOutPeriod);
(10) if(errCode==Port::Aborted) { //exchange signalling
(11) Bin state; state<<object1<<object2<<. . . ;
(12) . . . //removal of all objects that are not required
(13) excThread.setExchangeInfo(ThreadName, ReceiveExcPointId, state); //no return to this point
(14) }
(15) if(errCode==Port::TimeOut) {
(16) error(myName, "Server is Timed out"); //no return
(17) }

The above example indicates the program parts of an exchange thread object essential for the exchange (line (01)). Only the lines newly added compared to the non-exchangeable example "Port::receive" will be explained. In line (10), the error code "Port::Aborted" is tested to establish whether an exchange has been detected. If an exchange is to be carried out, first the states of the local objects of the thread are gathered (line (11)). The states are gathered in a special object of the "Bin" type, which defines the operators "<<" and ">>". The operator "<<" gathers the states of an object and the operator ">>" restores them. Then the thread can delete objects and carry out other measures so as not to waste any resources (line (12)). After the last call of "ExcThread.setExchangeInfo", the gathered states are transmitted from the exchange thread to the new process (line (13)). The first parameter (ThreadName) indicates the called thread, the second parameter (ReceiveExcpointId) is an integer variable which denotes the exchange point in the called thread, and the third parameter (state) denotes the states to be delivered. The thread never returns from "setExchangeInfo".

After an exchange thread has gathered the states of an old process at an exchange point and has stopped the old process, it is necessary to start the threads of a new process at a respective point (Restartpoint). Then there may be the problem that the Restartpoint lies in a function that is not reached until various other functions have been called. Therefore, after the call of the new process, first the Restartpoint is to be reached without other statements being executed. This may be attained, for example, in functions of the C++ programming language by means of the "goto" instruction. At the beginning of a function, first a jump is made to the function which contains the Restartpoint. This may also be realized via a plurality of function levels. After the Restartpoint has been reached, the state variables are set again and the new process is carried on with the statement that would have been the next statement in the old process before the abort. The practical functioning of this can be shown with the aid of the example below:

(01) Static int restart;
(02) void fctB( ) {
(03) if(restart) goto ExcPointX; //only this single exchange point in 'fctB'
(04) . . .
(05) ExcPointX:
(06) if(restart) "reset state";
(07) . . . //local exchange point in function 'fctB'
(08) }
(09) void fctA( ) {
(10) if(restart) goto ExcPointX; //only this single exchange point in 'fctA'
(11) . . .
(12) ExcPointX: fctB( );
(13) . . .
(14) }
(15) void threadBody( ) {
(16) restart=getExcInfo(ThreadName, excPointId, deliveredState);
(17) if(restart)
(18) switch(excPointId) {
(19) ExcPointIdX: goto ExcPointX;
(20) ExcPointIdY: goto ExcPointY;
(21) . . .
(22) }
(23) . . .
(24) ExcPointX: fctA( );

(25) . . .

(26) }

The function "threadbody" (line (15)) causes the function "fctA" and this one the function "fctB" which contains the restart point. First there is tested in the function "threadBody" whether "restart" is true (line (17)). If it is, the respective restart point is selected and a jump is made to the respective jump target (ExcpointX; line (24)). There the function "fctA" is called. In the function "fctA" (lines (09)) to (14), the same procedure is repeated. At the jump target "ExcpointX" (line (12)), the function "fctB" is jumped to, that is, to the jump target "ExcpointX" (line (05)) in the function "fctB" (lines (02) to (08)).

Once the restart point has been reached, the objects are to be reconstructed. By way of illustration may be used the above example "Port::receive" which additionally contains a state transformation. This state transformation is stated in the lines (01) to (05) in the example below:

(01) ExcThread excThread( . . . ); //generation of an exchange thread object

(02) . . .

(03) ReceiveExcPoint:

(04) if(restart) {

(05) deliveredState>>object1>>object2>>. . . ;

(06) excThread.restartPointReached(deliveredState);

(07) }

(08) buf. clear( );

(09) errCode=servicePort.receive(buf, TimeOutPeriod);

(10) if(errCode==Port::Aborted) {//exchange signalling

(11) Bin state; state<<object1<<object2 <<. . . ;

(12) . . . //removal of all the objects that are not required

(13) excThread.setExchangeInfo(ThreadName, ReceiveExcPointId, state); //no return to this point

(14) }

(15) if(errCode==Port::TimeOut) {

(16) error(myName, "Server is Timed out"); //no return

(17) }

The reconstruction of the states after the exchange (compare line (05) ends with a call of the method "ExcThread.restartPointReached" (line (06)). This ensures the simultaneous start of all the application threads in the new process. The parameter "deliveredState" of "restartPointReached" is necessary to test whether the state has been read correctly.

As observed above, processes communicate through ports. For this purpose, the ports of the old process are also to be present in the new process (port conversion). In the CHORUS operating system, a port conversion can be easily implemented. The state of a port is transmitted in the same manner as the state of other objects. The only difference is that the state of a port is transferred with the special method "Port::migrate". An example of a program which forms part of the old process will be stated below:

(01) Bin state;

(02) . . .

(03) state<<. . . <<servicePort.migrateo <<. . . ;

(05) . . .

(06) excThread.setExcInfo(ThreadName, ExcPointId, state);

In the new process the migrated port is built up directly from the delivered state. During the time used for processing the method "Port::migrate", no external message is lost. All the messages still arriving are queued up in a queue of the port and delivered to the new process together with the port.

Figure 7:
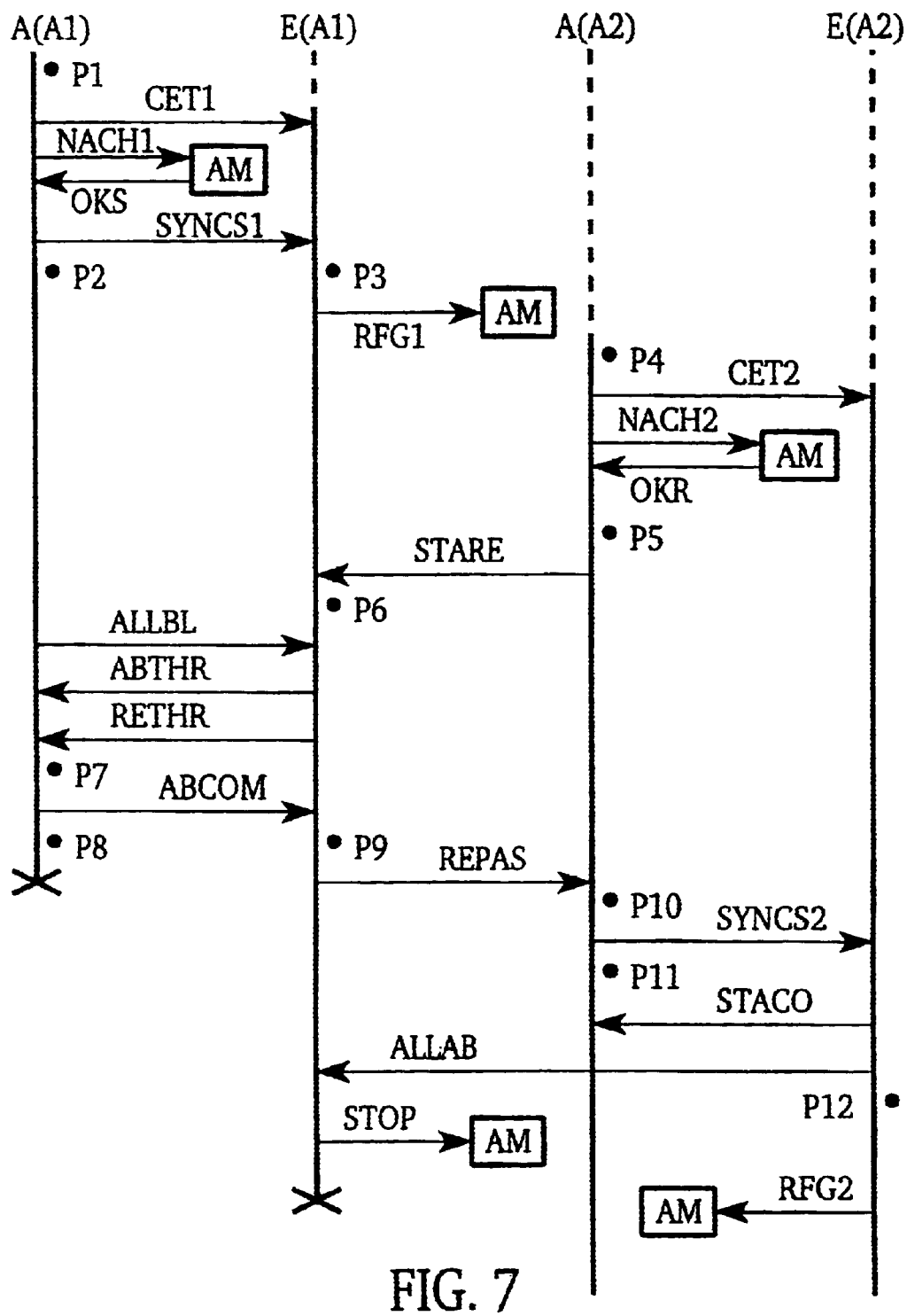
FIG. 7 shows a message flow chart between an old and a new process.

FIG. 7 shows a message flow chart in further explanation of the exchange process. First the process A1 is started. The process A1 is to be replaced with a process A2. The process A1 thus represents a predecessor component and the processor A2 a successor component. The exchange is controlled by a replacement server AM which is accommodated in a node as a special software component. In FIG. 7 the replacement server AM is represented as a rectangle referenced AM.

The message flow chart in FIG. 7 shows the relations of the application threads of the processes A1 and A2 and the respective exchange threads E(A1) and E(A2). For clarity, the message flow chart of FIG. 7 shows only a single application thread A(A1) and A(A2) for each process A1 and A2. The message flow which is realized by various mechanisms (for example: "Port::send/Port::receive"; "Semaphore:: get/Semaphore::rel") is featured by a respective arrow.

In the message flow chart of FIG. 7, initially process A1 is loaded and started (point P1). This process generates the exchange thread E(A1) (arrow CET) and sends a message (arrow NACH1) to the replacement server A1. The replacement server A1 responds (arrow OKS) and thereby indicates that no successor component exists. Subsequently, an application thread A(A1) of the process A1 synchronizes the start of the exchange thread E(A1) of the process A1 (arrow SYNCS1). Thereafter, the application threads go over to their original tasks (point P2).

After the synchronization of the start of the exchange threads E(A1) of the process A1 by an application thread A(A1) of the process A1, the exchange thread E(A1) sets its priority lower than the priority of the application thread A(A1) (point P3). This is effected to keep the influence of the exchange thread E(A1) on the application thread A(A1) as small as possible. Furthermore, a point P3, the exchange thread E(A1) generates an exchange port so that this port can be reached by the successor component (process A2). Then the exchange thread E(A1) signals to the replacement server A1 that is ready for an exchange (arrow RFG1).

Once the process A2 has been loaded as a successor component of the process A1 (predecessor component) and started (point P4), and an exchange thread E(A2) of the second process A2 has been generated (arrow CET2), first a message (arrow NACH2) is sent to the replacement server AM. The replacement server AM sends a response (arrow OKR) to one of the application threads A(A2) of the process A2 which response indicates that the successor component is to replace a predecessor component (process A1). Subsequently, this application thread of the process A2 generates a respective reference to the exchange port (point P5) of the predecessor component and informs the exchange thread E(A1) of the process A1 that the exchange procedure has started (arrow STARE).

This message of the process A2 activates the exchange thread E(A1) of the first process. The first thing the exchange thread E(A1) does is making its exchange port inaccessible, so that there is avoided that another component (process) sends an exchange message (point P6). When all the application threads A(A1) of the process A1 have stopped, the exchange thread E(A1) receives the message that all the threads have stopped (arrow ALLBL), and then gives an abort instruction (arrow ABTHR) to all the application threads A(A1) of the first process A1. Once an instruction (arrow RETHR) for continuance of the exchange procedure has been received from an exchange thread E(A1) of the first process A1, each application thread A(A1) of the first process A1 gathers its states (point P7), sends an acknowledge signal (arrow ABCOM) to the exchange thread E(A1) and erases itself in the end (point P8).

The exchange thread E(A1) of the first process A1 gathers the various states of the application thread A(A1) of the first process A1 (point P9) and sends them to the application thread A(A2) of the second process A2 (arrow REPAS), which has announced the beginning of the exchange procedure (see arrow STARE). The received state is conveyed to the application thread A(A2) (point P10) which take over their part of the state and reconstruct their objects therefrom (point P11). Simultaneously, the exchange thread E(A2) is informed accordingly (arrow SYNCS2), which exchange thread E(A2), after all the restart points have been reached, releases the application threads A(A2) for executing their original task (arrow STACO).

Finally, the exchange thread E(A2) of the second process A2 signals to the exchange thread E(A1) of the first process A1 that the exchange procedure has ended (arrow ALLAB). The exchange thread E(A1) of a first process A1 sends a stop message to the replacement server (arrow STOP) and stops itself. The exchange thread E(A2) of the second process A2 then prepares itself that it is relieved at a later instant by a successor component. The exchange thread then generates an exchange port, sets itself to the lowest priority level (point P12) and informs the replacement server AM that the exchange thread is ready for an exchange (arrow RFG2).

What is claimed is:

1. A communication system comprising:
   a control circuit including a message-based operating system;
   application software including at least one software component, the software component including a process with an application thread, an exchange port, and an exchange thread; and
   means for exchanging an old software component of the application software with a new software component,
   wherein, when the old software component is to be replaced, said exchanging means causes the old software component to carry out a state transfer, to stop at a certain point and to direct available messages to the new software component,
   wherein the old software component to be replaced is adapted for gathering its states after the application thread has stopped at the certain point, and
   wherein the exchange thread of the old software component is used for transferring the states to the new software component through the exchange port.

2. A communication system as claimed in claim 1, wherein the application thread of the old software component includes a first partition for gathering at least the states of the old software component to be exchanged, the application thread of the old software component is used for delivering the gathered states to the exchange thread of the old software component and,
   wherein the new software component includes an application thread including a second partition for taking over the gathered states from the exchange thread of the old software component and for reconstructing objects related to the gathered states.

3. A communication system as claimed in claim 1, further comprising a replacement server as a further software component, which is used for loading and starting software components and for identifying whether a newly started software component is to replace the old software component.

4. A communication system as claimed in claim 3, further comprising a maintenance device for delivering the new software component to the replacement server via a transmission medium.

5. A communication system as claimed in claim 1, wherein, after loading and starting of the new software component, a jump is made to an exchange point that corresponds to the exchange point of the old software component.

6. A communication system as claimed in claim 1, wherein when a plurality of processes are to be exchanged, the processes are exchanged consecutively.

7. A computer system comprising:
   a computer including a message-based operating system;
   application software, executable by said computer, including at least one software component, the software component including a process with an application thread, an exchange port, and an exchange thread; and
   means for exchanging an old software component of the application software with a new software component,
   wherein, when the old software component is to be replaced, said exchanging means causes the old software component to carry out a state transfer, to stop at a certain point and to direct available messages to the new software component,
   wherein the old software component to be replaced is adapted for gathering its states after the application thread has stopped at the certain point, and
   wherein the exchange thread of the old software component is used for transferring the states to the new software component through the exchange port.

8. A computer system as claimed in claim 7, wherein the application thread of the old software component includes a first partition for gathering at least the states of the old software component to be exchanged, the application thread of the old software component is used for delivering the gathered states to the exchange thread of the old software component, and
   wherein the new software component includes an application thread including a second partition for taking over the gathered states from the exchange thread of the old software component and for reconstructing objects related to the gathered states.

9. A computer system as claimed in claim 7, further comprising a replacement server as a further software component, which is used for loading and starting software components and for identifying whether a newly started software component is to replace the old software component.

10. A computer system as claimed in claim 9, further comprising a maintenance device for delivering the new software component to the replacement server via a transmission medium.

11. A computer system as claimed in claim 7, wherein, after loading and starting of the new software component, a jump is made to an exchange point that corresponds to the exchange point of the old software component.

12. A method for facilitating exchange of software components for a system comprising a message-based operating system and application software said method comprising the steps of:
   determining that an old software component of the application software is to be exchanged with a new software component,
   causing the old software component that is to be exchanged to perform the steps of:
      stopping an application thread of the old software component at a certain point,
      gathering its states after an application thread has stopped at the certain point, using an exchange thread of the old software component to transfer the gathered states to the new software component through an exchange port of the old software component, and directing available messages to the new software component.

13. The method as claimed in claim 12, wherein said gathering step includes gathering the states of the old software component to be exchanged in a first partition of the application thread, and using the application thread of the old software component to deliver the gathered states to the exchange thread of the old software component, and wherein the new software component includes performing the steps of:

using an application thread including a second partition to take over the gathered states from the exchange thread of the old software component, and reconstructing objects related to the gathered states.

14. A method as claimed in claim 12, further comprising the steps of:

loading and starting software components using a replacement server; and identifying whether a newly started software component is to replace the old software component.

15. A method as claimed in claim 14, further comprising the steps of delivering the new software component to the replacement server via a transmission medium using a maintenance device.

16. A method as claimed in claim 12, further comprising the step of, after loading and starting of the new software component, jumping to an exchange point that corresponds to the exchange point of the old software component.

* * * * *